Oct. 17, 1950     A. G. GURRIES ET AL     2,526,130
EARTH LEVELING IMPLEMENT
Filed Dec. 29, 1945     2 Sheets-Sheet 2
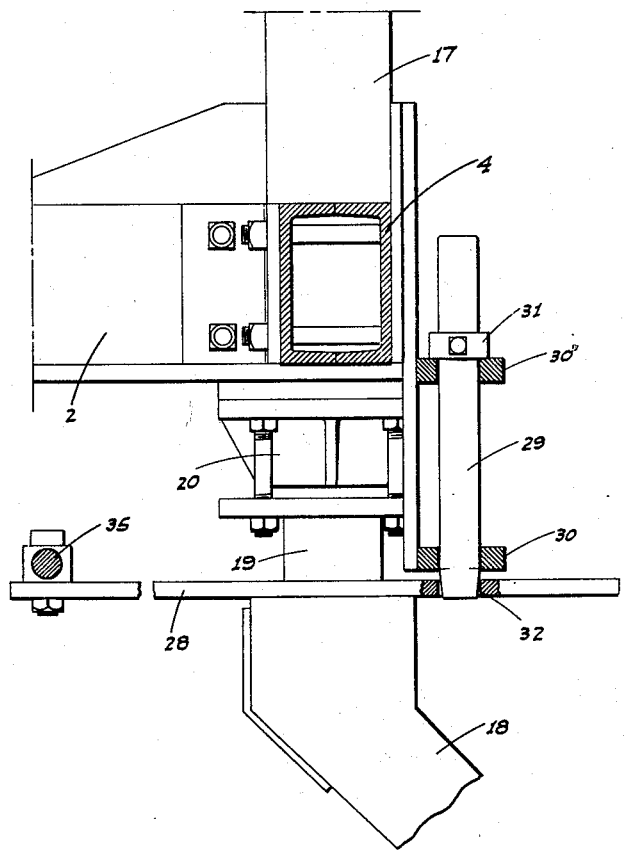
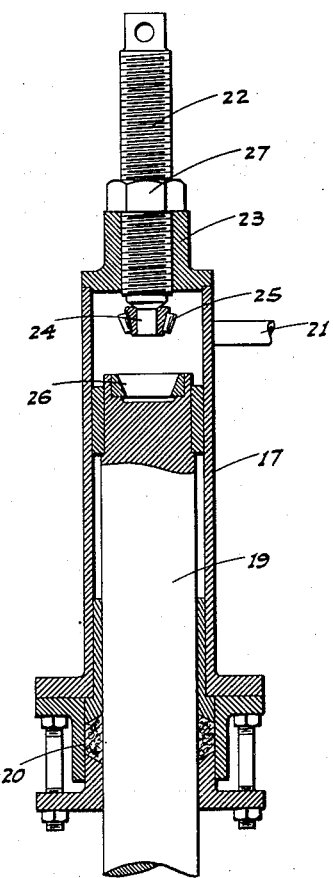
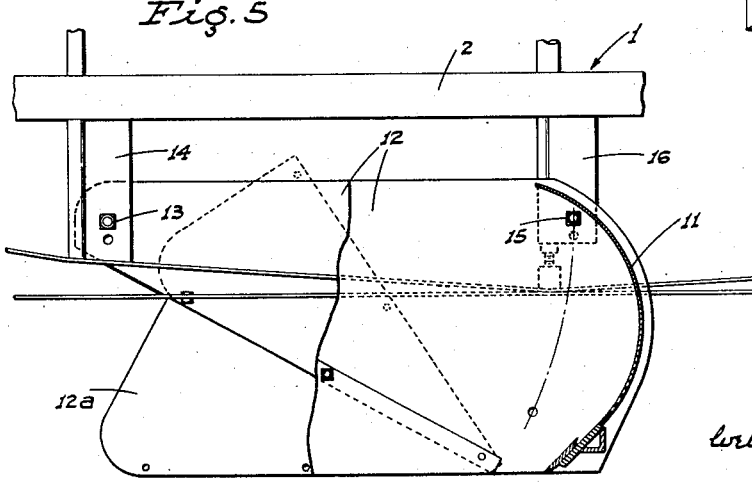
INVENTORS
A. G. Gurries
J. A. White Jr.
ATTORNEYS Patented Oct. 17, 1950

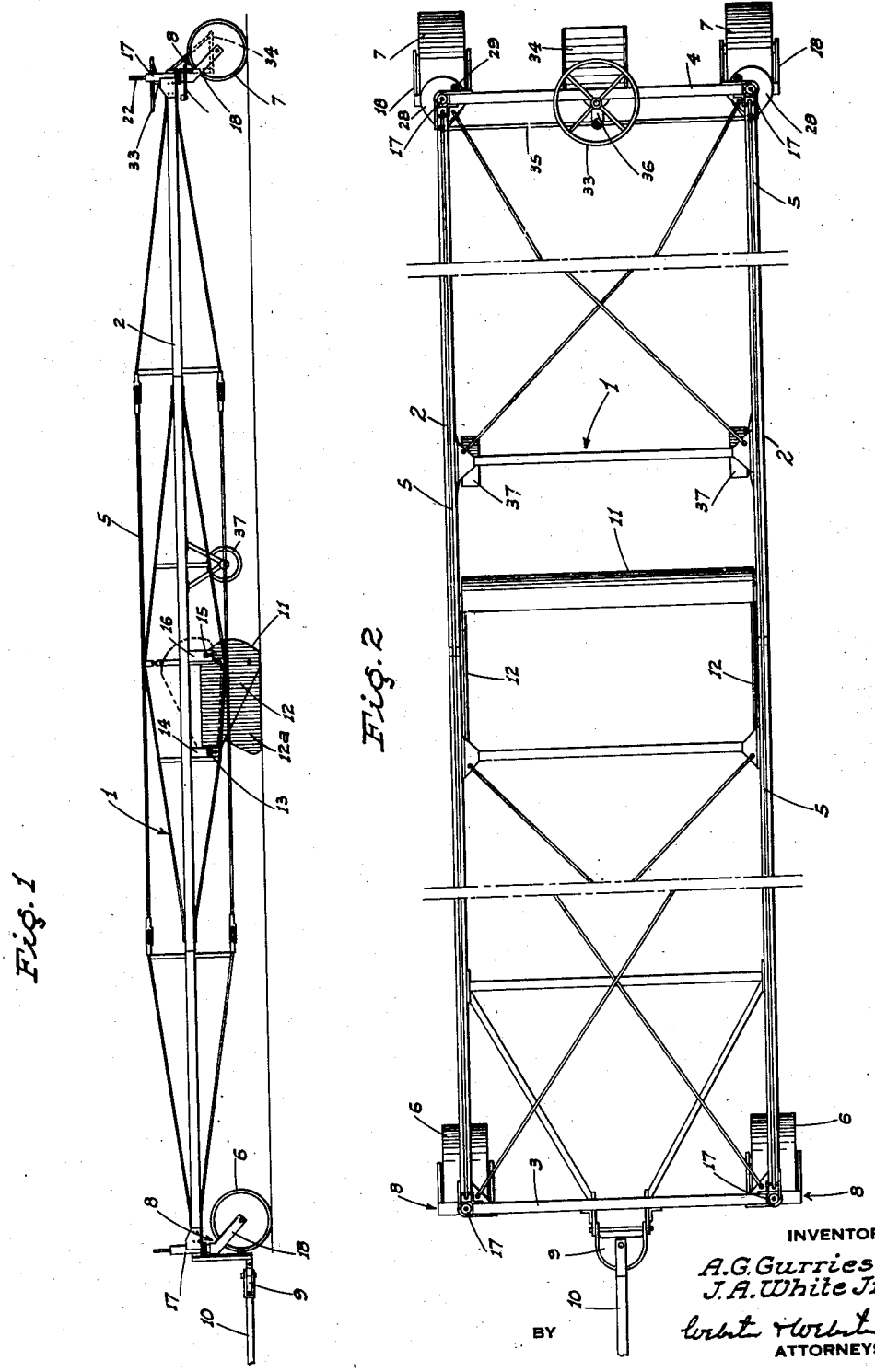

2,526,130

UNITED STATES PATENT OFFICE 2,526,130

EARTH LEVELING IMPLEMENT

Albert G. Gurries and John A. White, Jr., Gilroy, Calif., assignors, by direct and mesne assignments, to Be-Ge Manufacturing Co., Gilroy, Calif., a corporation of California Application December 29, 1945, Serial No. 638,016

6 Claims. (Cl. 37—153)

This invention relates generally to an improved earth working implement, and in particular is directed to a tractor-drawn finish leveler of the type which includes an extremely elongated main frame, wheel supported at opposite ends, and provided with a drag scraper bowl suspended therefrom intermediate its ends.

One feature of the present invention resides in the provision of a wheel mounting unit at each corner of the main frame, which unit includes a fluid pressure actuated power cylinder whereby the main frame may be power-elevated to a transport position with the scraper bowl clearing the ground; each such unit incorporating a vertical, wheel-supporting spindle projecting upwardly, as a piston, into a cylinder fixed on the main frame.

Another feature of this invention is the novel arrangement employed to accomplish adjustment of the lowered or working position of the main frame; said means including a vertical adjustment screw threaded through the upper end of each power cylinder described in the preceding paragraph, said screw thus serving as an adjustable stop to limit relative upward movement of the corresponding spindle-piston in said cylinder. Anti-friction means is provided between the adjacent ends of each screw and corresponding spindle-piston, whereby to permit said spindle-piston to rotate in the cylinder without resistance from the screw on account of the weight of the implement when the frame is in lowered working position.

A further feature is a safety wheel mounted on the main frame to the rear of the scraper bowl but some distance ahead of the rear wheels, said safety wheel being normally above ground but operative to engage the ground and prevent damage to the frame, and the bowl in its raised transport position, when the very long implement traverses railroad grades, levees, or the like.

An additional feature is the provision of a novel steering and locking assembly arranged so that the rear caster wheels of the implement may be locked when the frame is in lowered working position, or said rear caster wheels steered when said frame is elevated for transport.

A further object of the invention is to provide an earth leveling implement which will be effective for the purpose desired.

These objects are accomplished by means of such structure and relative arrangement of parts as will fully appear by a perusal of the following specification and claims.

In the drawings similar characters of reference indicate corresponding parts in the several views:

Figure 1 is a side elevation of the implement with the frame in lowered or working position.

Figure 2 is a plan view of the implement.

Figure 3 is an enlarged fragmentary elevation, partly in section, of one of the wheel mounting units.

Figure 4 is an enlarged fragmentary sectional elevation of the power cylinder as embodied in each wheel mounting unit.

Figure 5 is a fragmentary longitudinal sectional elevation of the scraper bowl and the means connecting the same in depending relation to the main frame.

Referring now more particularly to the characters of reference on the drawings, the implement comprises an extremely elongated main frame, indicated generally at 1, and which includes transversely spaced parallel side beams 2, a front end beam 3, and a rear end beam 4. The main frame 1 is suitably trussed and braced, and includes longitudinally extending adjustable tie rods 5.

The implement is supported, at its ends, by a pair of transversely spaced front wheels 6 and a transversely spaced pair of rear wheels 7; the wheels 6 and 7 each being secured in connection with a corresponding corner of the main frame 1 by a caster type wheel mounting unit 8. These units 8 will be described hereinafter in greater detail.

At the forward end the main frame 1 is provided with a hitch 9 including a draft tongue 10 adapted to couple to a tractor.

Substantially centrally of its ends the implement is provided with a drag-type scraper bowl 11, which includes forwardly projecting side wings 12. The side wings are pivoted, adjacent their forward ends, as at 13, on rigid depending brackets 14 secured in connection with the side beams 2. Adjacent their rear ends the side wings 12 are vertically adjustably secured, by bolts 15, to rigid depending brackets 16, likewise fixed in connection with the side beams 2. As so mounted the scraper bowl 11 is adjustable from the working position shown in full lines, to the elevated or transport position shown in dotted lines, in Fig. 1. Skirts 12a are secured to and normally depend from the side wings 12, but are mounted for vertical adjustment, in elevated position, when the bowl is in its elevated or transport position.

Each of the wheel mounting units 8 includes an upstanding cylinder 17 fixed in connection with the adjacent corner of the main frame 1, The corresponding wheel of the implement is carried in a divergent fork 18 on the lower end of a vertical spindle 19 of substantial diameter. Each spindle 19 projects into the corresponding cylinder 17, as a piston, through a packing gland 20 on the lower end of said cylinder.

Fluid pressure is introduced into the upper end of each cylinder 17 through the medium of a conduit 21 included in a fluid pressure supply system otherwise not shown. Such fluid pressure supply system includes, however, control valve means on the tractor for regulation by the tractor operator.

When fluid pressure is introduced into the cylinders 17 to cause relative separating motion between the spindle-pistons 19 and the cylinders 17, the main frame 1, together with the scraper bowl 11, is raised to a transport position, with said bowl in clearance relation above the ground. However, when the cylinders 17 are relieved of pressure there is a relative telescoping movement between said spindle-pistons 19 and cylinders 17, permitting the main frame 1 and scraper bowl to lower to working position.

Said lowered or working position is maintained, at adjusted level, as follows:

A heavy-duty vertical screw 22 is threaded through a neck 23 on the upper end of each cylinder 17, and projects into the latter as a stop, whereby to limit the extent to which each spindle-piston may project into the corresponding cylinder. At its lower end each vertical adjustment screw 22 is reduced in diameter, as at 24, and there provided with a taper roller bearing 25 adapted to matchingly engage in a taper seat 26 secured on the upper end of the corresponding spindle-piston. Thus when each cylinder 17 is in contracted or lowered relation to the corresponding spindle-piston, the taper roller bearing 25 engages in the taper seat 26 so that rotation of said spindle in the cylinder 17, as the corresponding wheel swivels, is not restricted by reason of the weight of the main frame bearing on the upper end of said spindle piston.

By proper adjustment of the vertical screws 22, which are each normally held against rotation by a lock nut 27, the main frame 1 may be accurately adjusted to a desired working level.

The following locking means is employed to automatically lock the wheel mounting units of the rear wheels 7 to prevent swiveling of the latter during movement of the implement in a straight line across a field, but which locking means is automatically released to permit said rear wheels 7 to caster or swivel when the implement makes a turn at the end of the field. A horizontal disc 28 is fixed on the upper end of each fork 18 in surrounding relation to the corresponding spindle-piston 19 below the cylinder 17. A vertical locking pin 29 is vertically adjustably supported from the adjacent portion of the frame 1 by a guide unit 30 and an adjustable collar 31; said locking pin 29 being adjusted so that when the main frame is in its lowered or working position, the lower end of said pin projects in locking relation into a hole 32 in the disc 28. The pin 29 engages in the hole 32 when the rear wheels 7 are in a straight-ahead position, and as so locked said wheels cannot weave laterally as the implement traverses a straight-line path across a field. However, to make a turn at the end of a field, the operator actuates the cylinders 17 of the rear wheel mounting units 8 sufficient to raise the main frame slightly at its rear end. When this occurs the pins 29 of said rear wheel mounting units 8 pull out of the holes of corresponding discs 28, so that the rear wheels 7 may caster or swivel as the implement is turned. As soon as the implement again travels in a straight line, and upon lowering of the rear end of the main frame 1 to working position, the pins 29 automatically return to the holes 32 of the discs 28 of the rear wheel mounting units.

For transport of the implement from place to place, the scraper bowl 11 is first adjusted upwardly to its non-working position, as shown in dotted lines in Fig. 1, and then the cylinders 17 are actuated to cause substantial raising of said main frame both at the front and rear ends. The implement may then be towed by the tractor, and steering of the implement is facilitated by means of the following rear end steering arrangement:

A steering wheel 33 is mounted on the frame 1 at the rear centrally of its sides and adjacent an operator's stand-up platform 34. Steering rods 35 extend from a steering mechanism 36 actuated by the wheel 33; said steering rods 35 extending in opposite directions and detachably connecting in any conventional manner as by bolts, pins or the like, with the discs 28 of the rear wheel mounting units. In this manner the rear wheels 7 of the implement are effectively steered. It is understood, of course, that the steering rods 35 are detached from the rear wheel mounting units 8, when the implement is in use.

In order to avoid any damage to the main frame 1 and the bowl 11, when the same are in transport position, but upon passage over railroad grades or levees, there are provided safety wheels 37 which depend from the main frame adjacent but to the rear of the scraper bowl. While said safety wheels are above ground in normal working position of the main frame, they will ride the ground and prevent damage to parts of the implement which would otherwise engage said ground upon passage over said railroad grades or levees.

The finishing leveler, as hereinbefore described, provides an effective, practical implement for the grading of earth; the structure being rugged, simplified, and requiring a minimum of maintenance or repair.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A finish leveler comprising an elongated frame disposed above ground and having a scraper bowl depending therefrom intermediate its ends, a transversely spaced pair of wheels at the front end of the frame, a transversely spaced pair of wheels at the rear end of the frame, said pairs of wheels being mounted in connection with the frame in supporting relation to the latter, the scraper bowl being vertically adjustable on the main frame between a lowered working position and a raised transport position, and a safety wheel mounted on and depending from the main frame adjacent the scraper bowl; said safety wheel being normally clear of the ground but depending below the scraper bowl when the latter is in raised transport position.

2. A finish leveler comprising an elongated frame disposed above ground and having a scraper bowl depending therefrom intermediate its ends, a transversely spaced pair of wheels at the front end of the frame, a transversely spaced pair of wheels at the rear end of the frame, a caster mount for each wheel, and means securing the caster mounts to the main frame; the caster mounts corresponding to the rear pair of wheels including power means operative to elevate the adjacent end of the frame from the working position thereof, and means operative to lock said rear pair of wheels against caster movement, said means being arranged to function only when said adjacent end of the frame is in working position.

3. A finish leveler comprising an elongated frame, a leveling instrumentality suspended below the frame intermediate its ends, a pair of spaced apart wheels adjacent the forward end of the frame and a pair of spaced apart wheels adjacent the rear end of the frame, an upstanding spindle on each wheel, each spindle being journaled in the frame whereby the wheels support the frame, means to lower and raise the frame on the spindles to carry the leveling instrumentality to a point adjacent the ground or to lift it from the ground, the several spindles being freely turnable in the frame when the latter is in elevated position, and means to automatically lock the rear spindles against turning movement relative to the frame as the same is moved to lowered position and the rear wheels are in direct trailing alinement with the front wheels.

4. A leveler as in claim 3 in which such locking means comprises a laterally projecting element on the spindle of each back wheel, each such element being provided with a vertical orifice, a vertically disposed pin on the frame above each such element, such pin being in alinement with the orifice in the corresponding element when the rear wheels are in direct trailing alinement with the front wheels and the frame is raised, and said pin being then movable into such orifice as the frame is lowered.

5. A leveler as in claim 4 including vertically spaced orificed flanges on the frame, the pins being vertically slidable in said orifices.

6. A leveler as in claim 5 including means to adjust the vertical position of said pins in the orifices and relative to the frame.

ALBERT G. GURRIES.
JOHN A. WHITE, Jr.

REFERENCES CITED

The following references are of record in the file of this patent:

UNITED STATES PATENTS

| Number | Name | Date |
| --- | --- | --- |
| 541,683 | Richards | June 25, 1895 |
| 645,363 | Kirkendall | Mar. 13, 1900 |
| 1,140,586 | Evesson | May 25, 1915 |
| 2,022,757 | Buffington | Dec. 3, 1935 |
| 2,085,944 | Best | July 6, 1937 |
| 2,124,625 | Marvin | July 26, 1938 |
| 2,203,615 | Gurries | June 4, 1940 |